United States Patent
Lee et al.

(10) Patent No.: US 8,638,993 B2
(45) Date of Patent: Jan. 28, 2014

(54) SEGMENTING HUMAN HAIRS AND FACES

(75) Inventors: Kuang-chih Lee, Uniton City, CA (US); Robinson Piramuthu, Oakland, CA (US); Katharine Ip, Mountain View, CA (US); Daniel Prochazka, Pacifica, CA (US)

(73) Assignee: FlashFoto, Inc., Los Gatos, CA (US)

( * ) Notice: Subject to any disclaimer, the term of this patent is extended or adjusted under 35 U.S.C. 154(b) by 164 days.

(21) Appl. No.: 13/066,112

(22) Filed: Apr. 5, 2011

(65) Prior Publication Data

US 2011/0299776 A1 Dec. 8, 2011

Related U.S. Application Data

(60) Provisional application No. 61/341,707, filed on Apr. 5, 2010.

(51) Int. Cl.
*G06K 9/00* (2006.01)

(52) U.S. Cl.
USPC ........... 382/118; 382/162; 382/163; 382/164; 382/165; 382/167

(58) Field of Classification Search
USPC .......................... 382/118, 115–117, 162–167
See application file for complete search history.

(56) References Cited

U.S. PATENT DOCUMENTS

| | | | |
|---|---|---|---|
| 6,965,693 B1 * | 11/2005 | Kondo et al. | 382/190 |
| 2003/0095701 A1 * | 5/2003 | Shum et al. | 382/155 |
| 2009/0087089 A1 * | 4/2009 | Hu | 382/165 |

FOREIGN PATENT DOCUMENTS

JP 2005339522 A * 12/2005

OTHER PUBLICATIONS

Lipowezky et al: "Using integrated color and texture features for automatic hair detection", IEEE, 2008.*
Foley, Computer Graphics: Principles and Practice, Addison-Wesley Professional, p. 13, 1995.
Russ, Chapter 6—Segmentation and Thresholding, The Image Processing Handbook, 4th Ed., pp. 333-381, 2002.
Grady et al., Random Walks for Interactive AlphaMatting, Visualization, Imaging, and Image Processing: Fifth IASTED International Conference Proceedings, pp. 1-7, 2005.
Ioffe S., Probabilistic methods for finding people, International Journal of Computer Vision, vol. 43, issue 1, pp. 45-68 2001.
Vezhnevets V. et al., A Comparative Assessment of Pixel-Based Skin Detection Methods, Technical Report, Graphics and Media Laboratory, 2005.

(Continued)

*Primary Examiner* — Ruiping Li

(57) ABSTRACT

Systems for segmenting human hairs and faces in color images are disclosed, with methods and processes for making and using the same. The image may be cropped around the face area and roughly centered. Optionally, the illumination environment of the input image may be determined. If the image is taken under dark environment or the contrast between the face and hair regions and background is low, an extra image enhancement may be applied. Sub-processes for identifying the pose angle and chin contours may be performed. A preliminary mask for the face by using multiple cues, such as skin color, pose angle, face shape and contour information can be represented. An initial hair mask by using the abovementioned multiple cues plus texture and hair shape information may be created. The preliminary face and hair masks are globally refined using multiple techniques.

15 Claims, 14 Drawing Sheets

(56) References Cited

OTHER PUBLICATIONS

Comaniciu, Mean Shift: A Robust Approach Toward Feature Space Analysis, IEEE Transactions on Pattern Analysis and Machine Intelligence, 24, 603-619, 2002.

Vincent L. et al., Watersheds in Digital Spaces: An Efficient Algorithm Based on Immersion Simulations, IEEE Transactions on Pattern Analysis and Machine Intelligence, vol. 13, No. 6, pp. 583-598, Jun. 1991.

Levin A. et al., A Closed-Form Solution to Natural Image Matting, IEEE Transactions on Pattern Analysis and Machine Intelligence (PAMI), vol. 30, No. 2, Feb. 2008.

Collins M. et al., Logistic regression, Adaboost, and Bregman distances, Machine Learning, 48(1-3), 2002.

Dalai N. et al., Histograms of Oriented Gradients for Human Detection, Proceedings of the IEEE Conference on Computer Vision and Pattern Recognition, pp. 1-8, 2008.

Zuiderveld K., Contrast Limited Adaptive Histogram Equalization, Graphics Gems IV, pp. 474-485 1994.

\* cited by examiner

SEGMENTING HUMAN HAIRS AND FACES

CROSS REFERENCE TO RELATED APPLICATION

This application claims priority to U.S. Provisional Patent Application No. 61/341,707, filed Apr. 5, 2010, which is hereby incorporated by reference herein in its entirety.

BACKGROUND OF THE INVENTION

Images have been utilized to capture precious moments since the advent of the photograph. With the emergence of the digital camera, an unimaginable number of photographs are captured every day. Certain precious moments have significant value to a particular person or group of people, such that photographs of a precious moment are often selected for a personalized presentation. For example, greeting card makers now allow users to edit, configure, or otherwise personalize their offered greeting cards, and a user will likely put in a photograph of choice to add their personal touch to a greeting card. Items that may be used for creating a personalized presentation abound, such as t-shirts, mugs, cups, hats, mouse-pads, other print-on-demand items, and other gift items and merchandise. Personalized presentations may also be created for sharing or viewing on certain devices, uploading to an online or offline location, or otherwise utilizing computer systems. For example, personalized presentations may be viewed on desktop computers, laptop computers, tablet user devices, smart phones, or the like, through online albums, greeting card websites, social networks, offline albums, or photo sharing websites.

Many applications exist for allowing a user to provide context to a photograph for providing a humorous, serious, sentimental, or otherwise personal message. Online photo galleries allow their customers to order such merchandises by selecting pictures from their albums. Kiosks are available at big retail stores all around the world to address similar needs. However, there is no approach available to the general population for creating a personalized presentation that allows for placing a person's head within another image or graphic. Indeed, the placement of a person's head from one image to another, though possessing the ability to create a multiple of applications, is a daunting task for the regular consumer and often, until now, is best handled by an expert image processor.

As should be apparent, there are needs for solutions that provide users with easier and or automated or semi-automated abilities for creating contextually personalized presentations of their images which allow for the segmentation of a human head from one image to be utilized for other applications of choice, including creating personalized presentations.

SUMMARY

The following presents a simplified summary of the disclosure in order to provide a basic understanding to the reader. This summary is not an extensive overview of the disclosure and it does not identify key or critical elements of the embodiments disclosed nor delineate the scope of the disclosed embodiments. Its sole purpose is to present some concepts disclosed herein in a simplified form as a prelude to the more detailed description that is presented later.

Segmenting or distinguishing salient regions within an image is a difficult task. Disclosed embodiments provide for creation of easier, semi-automated, and automated abilities for segmenting or distinguishing human heads from an image. In one embodiment, a head or heads to be distinguished are either provided, selected, located, or otherwise identified. This The elements to distinguish may all be processed together or may be done separately. In one alternative embodiment, data for the face of the head is gathered or acquired. Some or all of this data is then processed to distinguish the face of the head from the other elements of the image. In another alternative embodiment, data for the hair of the head is gathered or acquired. Some or all of this data is then processed to distinguish the hair from the other elements of the image. In an additional embodiment, the data for both elements face and hair of the head is gathered or acquired and this data is processed to distinguish the face and hair, individually or together, from the rest of the image. In an alternative additional embodiment, elements to be distinguished are selectively chosen to be distinguished and are done so individually or together. In images with more than one head, a single head to be distinguished may be chosen or more than one head may be chosen.

The elements that are distinguished may be represented in any number of processes, including creating an image mask. A head that has been distinguished from one image may be placed into another image or graphic. The ability to create a unique personalized message or image may be utilized to attract users to physical locations or electronically available locations, such as websites and web-forums. The attraction of users may be associated with the ability to sell advertisement space or provide an advertising campaign, either specifically related to the creation of personalized messages or images, or generally otherwise.

In another alternative embodiment, the image may be cropped around the face area and roughly centered. Optionally, the illumination environment of the input image may be determined. If the image is taken under dark environment or the contrast between the face and hair regions and background is low, an extra image enhancement may be applied. Sub-processes for identifying the pose angle and chin contours may be performed. A preliminary mask for the face by using multiple cues, such as skin color, pose angle, face shape and contour information can be represented. An initial hair mask by using the abovementioned multiple cues plus texture and hair shape information may be created. The preliminary face and hair masks may be globally refined using multiple techniques.

BRIEF DESCRIPTION OF DRAWINGS

The accompanying drawings, which are included as part of the present specification, illustrate the presently preferred embodiments and together with the general description given above and the detailed description of the preferred embodiments given below serve to explain and teach the principles of the disclosed embodiments.

Figure 1:
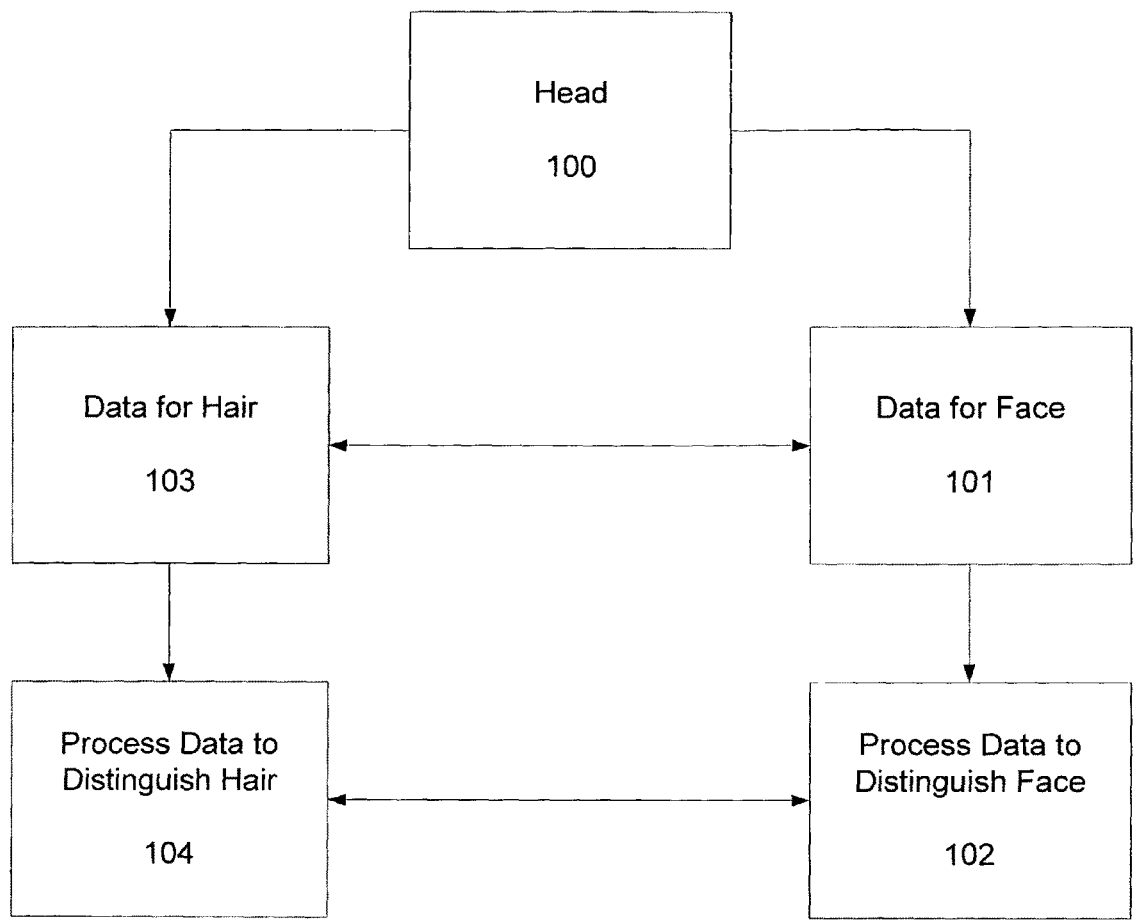
FIG. 1 is a diagrammatic illustration of a system, process or method for distinguishing elements representing a human head within an image, according to one embodiment.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not illustrate every aspect of the disclosed embodiments and do not limit the scope of the disclosure.

DETAILED DESCRIPTION

Systems for segmenting human hairs and faces in color images are disclosed, with methods and processes for making and using the same.

In the following description, for purposes of explanation, specific nomenclature is set forth to provide a thorough understanding of the various inventive concepts disclosed herein. However it will be apparent to one skilled in the art that these specific details are not required in order to practice the various inventive concepts disclosed herein.

Some portions of the detailed description that follow are presented in terms of processes and symbolic representations of operations on data bits within a computer memory. These process descriptions and representations are the means used by those skilled in the data processing arts to most effectively convey the substance of their work to others skilled in the art. A process is here, and generally, conceived to be a self-consistent sequence of sub-processes leading to a desired result. These sub-processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "locating" or "finding" or "reconciling", or "identifying", or the like, may refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The disclosed embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct more specialized apparatus to perform the required method sub-processes. The required structure for a variety of these systems will appear from the description below. In addition, the disclosed embodiments are not described with reference to any particular programming language. It will be appreciated that a variety of programming languages may be used to implement the teachings of the disclosed embodiments.

In some embodiments an image is a bitmapped or pixmapped image. As used herein, a bitmap or pixmap is a type of memory organization or image file format used to store digital images. A bitmap is a map of bits, a spatially mapped array of bits. Bitmaps and pixmaps refer to the similar concept of a spatially mapped array of pixels. Raster images in general may be referred to as bitmaps or pixmaps. In some embodiments, the term bitmap implies one bit per pixel, while a pixmap is used for images with multiple bits per pixel. One example of a bitmap is a specific format used in Windows that is usually named with the file extension of .BMP (or .DIB for device-independent bitmap). Besides BMP, other file formats that store literal bitmaps include InterLeaved Bitmap (ILBM), Portable Bitmap (PBM), X Bitmap (XBM), and Wireless Application Protocol Bitmap (WBMP). In addition to such uncompressed formats, as used herein, the term bitmap and pixmap refers to compressed formats. Examples of such bitmap formats include, but are not limited to, formats, such as JPEG, TIFF, PNG, and GIF, to name just a few, in which the bitmap image (as opposed to vector images) is stored in a compressed format. JPEG is usually lossy compression. TIFF is usually either uncompressed, or losslessly Lempel-Ziv-Welch compressed like GIF. PNG uses deflate lossless compression, another Lempel-Ziv variant. More disclosure on bitmap images is found in Foley, 1995, Computer Graphics Principles and Practice, Addison-Wesley Professional, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety.

In typical uncompressed bitmaps, image pixels are generally stored with a color depth of 1, 4, 8, 16, 24, 32, 48, or 64 bits per pixel. Pixels of 8 bits and fewer can represent either grayscale or indexed color. An alpha channel, for transparency, may be stored in a separate bitmap, where it is similar to a greyscale bitmap, or in a fourth channel that, for example, converts 24-bit images to 32 bits per pixel. The bits representing the bitmap pixels may be packed or unpacked (spaced out to byte or word boundaries), depending on the format. Depending on the color depth, a pixel in the picture will occupy at least n/8 bytes, where n is the bit depth since 1 byte equals 8 bits. For an uncompressed, packed within rows, bitmap, such as is stored in Microsoft DIB or BMP file format, or in uncompressed TIFF format, the approximate size for a n-bit-per-pixel (2n colors) bitmap, in bytes, can be calculated as: size width×height×n/8, where height and width are given in pixels. In this formula, header size and color palette size, if any, are not included. Due to effects of row padding to align each row start to a storage unit boundary such as a word, additional bytes may be needed.

In computer vision, segmentation refers to the process of partitioning a digital image into multiple regions (sets of pixels). The goal of segmentation is to simplify and/or change the representation of an image into something that is more meaningful and easier to analyze. Image segmentation is typically used to locate objects and boundaries (lines, curves, etc.) in images.

The result of image segmentation is a set of regions that collectively cover the entire image, or a set of contours extracted from the image. Each of the pixels in a region share a similar characteristic or computed property, such as color, intensity, or texture. Adjacent regions are significantly different with respect to the same characteristic(s).

Several general-purpose algorithms and techniques have been developed for image segmentation. Exemplary segmentation techniques are disclosed in *The Image Processing Handbook*, Fourth Edition, 2002, CRC Press LLC, Boca Raton, Fla., Chapter 6, which is hereby incorporated by reference herein for such purpose. Since there is no general solution to the image segmentation problem, these techniques often have to be combined with domain knowledge in order to effectively solve an image segmentation problem for a problem domain.

Some embodiments disclosed below create a mask, often stored as an alpha channel. In computer graphics, when a given image or portion of an image (or figure) is intended to be placed over another image (or background), the transparent areas can be specified through a binary mask. For each intended composite image there are three bitmaps: the image containing the figure, the background image and an additional mask, in which the figure areas are given a pixel value of all bits set to 1's and the surrounding areas a value of all bits set to 0's. The mask may be nonbinary when blending occurs between the figure and its surroundings.

To put the figure image over the background, the processes may first mask out the ground pixels in the figure image with the binary mask by taking a pixel by pixel product of the two bitmaps. This preserves the figure pixels. Another product is performed between the inverse of the binary mask and the background, removing the area where the figure will be placed. Then, the processes may render the final image pixels by adding the two product results. This way, the figure pixels are appropriately placed while preserving the background. The result is a compound of the figure over the background. Other blending techniques may be used to blend the figure with the new background, such as smoothing at the figure mask boundary.

Figure mask may be produced by segmenting the figure region from the background. In computer vision, segmentation refers to the process of partitioning a digital image into multiple regions. The pixels in a region share similar characteristics or computed properties. They may be similar in color and intensity, or be part of a larger texture or object. Adjacent regions are significantly different with respect to the same characteristic(s). Masks representing the different elements of the head may comprise of many layers, where each layer represents a meaningful region of pixels, such as face, hair, sunglasses, hat, and so on.

Throughout the present description of the disclosed embodiments described herein, all steps or tasks will be described using one or more embodiments. However, it will be apparent to one skilled in the art, that the order of the steps described could change in certain areas, and that the embodiments are used for illustrative purposes and for the purpose of providing understanding of the inventive properties of the disclosed embodiments.

FIG. 1 is a diagrammatic illustration of a system, process or method for distinguishing elements representing a human head within an image, according to one embodiment. In this embodiment, at 100 a head or heads to be distinguished are either provided, selected, located, or otherwise identified. This may be done in any number of operations, including by an autonomous process, semi-autonomous process, or manually. The elements to distinguish may all be processed together or may be done separately. In one alternative embodiment, data for the face of the head at 101 is gathered or acquired. Some or all of this data is then processed at 102 to distinguish the face of the head from the other elements of the image. In another alternative embodiment, data for the hair of the head at 103 is gathered or acquired. Some or all of this data is then processed at 104 to distinguish the hair from the other elements of the image. In an additional embodiment, the data for both elements face and hair of the head at 100 is gathered or acquired and this data is processed to distinguish the face and hair, individually or together, from the rest of the image. In an alternative additional embodiment, elements to be distinguished are selectively chosen to be distinguished and are done so individually or together. In images with more than one head, a single head to be distinguished may be chosen or more than one head may be chosen.

The elements that are distinguished may be represented in any number of processes, including creating an image mask. The elements distinguished may be utilized to create creative, humorous, message-delivering, or otherwise personalized presentations. A head that has been distinguished from one image may be placed into another image or graphic. For example, the image mask of the head may be placed into an electronically created greeting card, or onto images with celebrities, or otherwise placed into images or graphics with the intention of representing a person or persons heads within the images or graphics. As should be apparent, the utilization of the distinguished head may be utilized in a multiple of ways to create a personalized message or image. The ability to create a unique personalized message or image may be utilized to attract users to the creation of purchasable items, such as photos, t-shirts, coffee mugs, mouse-pads, greeting cards, and the like. The ability to create a unique personalized message or image may be utilized to attract users to physical locations or electronically available locations, such as websites and web-forums. The attraction of users may be associated with the ability to sell advertisement space or provide an advertising campaign, either specifically related to the creation of personalized messages or images, or generally otherwise.

Figure 2:
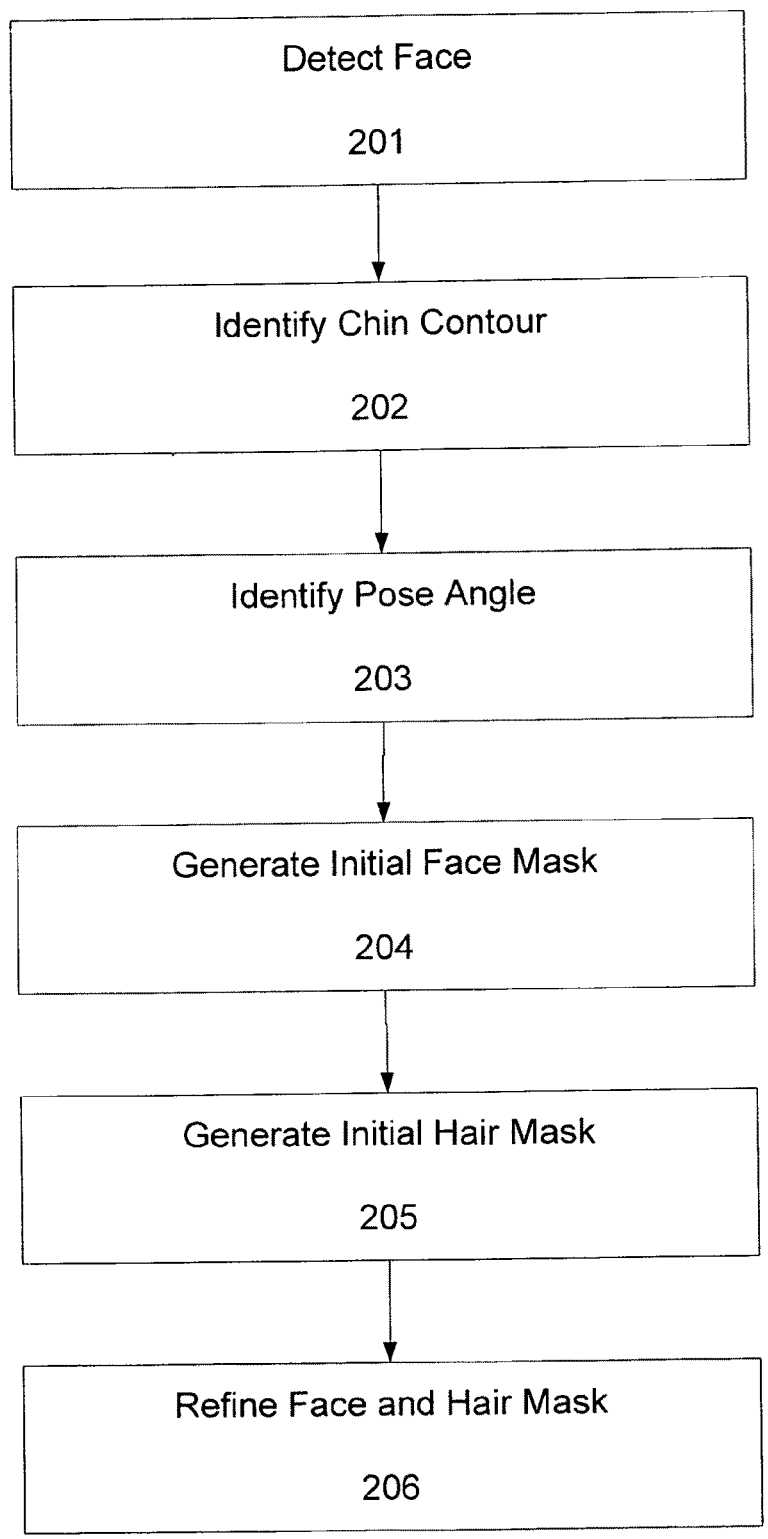
FIG. 2 is a diagrammatic illustration of a system, process or method for distinguishing elements representing a human head within an image, according to another embodiment.
Figure 3:
FIG. 3 is a sample color left image presented in gray scale utilized to illustrate the processes and sub-processes of the exemplary embodiments disclosed herein.

FIG. 2 is a diagrammatic illustration of a system, process or method for distinguishing elements representing a human head within an image, according to another embodiment. In this embodiment, face or faces are detected at 201. FIG. 3 is a sample color left image presented in gray scale utilized to illustrate the processes and sub-processes of the exemplary embodiments disclosed herein. The face detection operation may comprise any method of detecting faces, including utilizing a Haar-based Ada-Boost Classifier as disclosed in "Probabilistic Methods For Finding People", S. Ioffe, D. A. Forsyth, International Journal of Computer Vision, vol. 43, issue 1, pp. 45-68, 2001, and "Robust Real-time Object Detection," P. Viola, M. Jones, International Journal of Computer Vision, 2001, each of which are hereby incorporated in their entirety for this purpose. The face detector may be a hierarchical rule-based system where the rules were created based on performance on a set of training images. In an alternative embodiment, false alarms are removed by voting from detection results and an independent skin detector, such as disclosed in "A Comparative Assessment Of Pixel-Based Skin Detection Methods", V. Vezhnevets, A. Andreeva, Technical Report, Graphics and Media Laboratory, 2005, which is hereby incorporated by reference in its entirety for this purpose.

Figure 4:
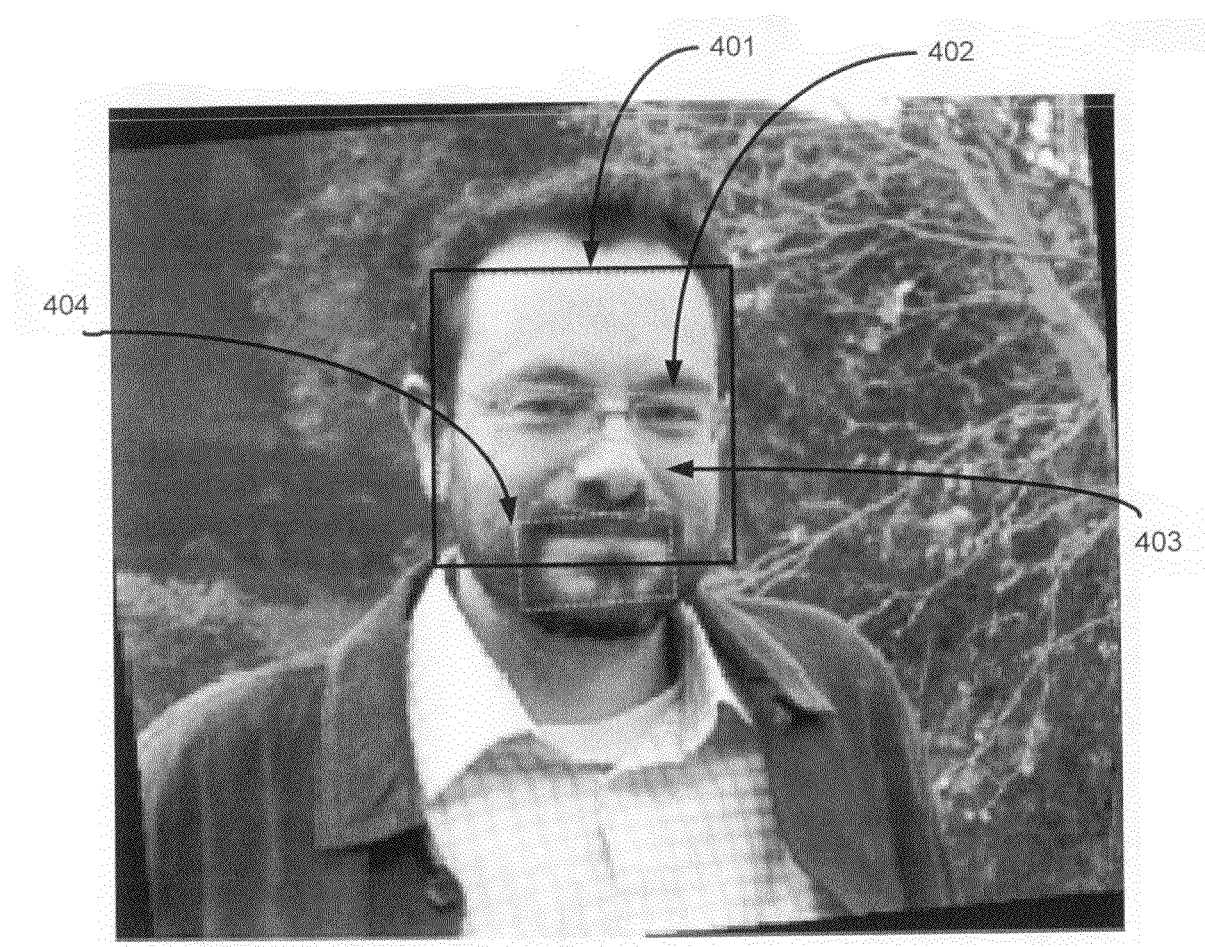
FIG. 4 is the sample image of FIG. 3 slightly zoomed in at the head and providing detection results from face and other elements detectors.

In another alternative embodiment, the location and rotation angle of eyes, nose, and mouth are also determined by Haar-based Ada-Boost Classifiers. The location of eyes can help to decide the pose angle, and all of facial components are useful for finding the face contour. FIG. 4 is the sample image of FIG. 3 slightly zoomed in at the head and providing detection results from face and other elements detectors. In FIG. 4, the region 401 represents the detected face area, the region 402 represents the eyes area, the region 403 represents the nose area, and the region 404 represents the mouth area. After the detection process, a rectangle window around each face region will be cropped for further process. In an additional embodiment, the image is cropped to the face area for further process.

Some images may optionally be processed to enhance image quality. For example, photos taken under a dark scene, low contrast background, and outdoor environment with strong directional sun lights may be selected for enhancement.

An image taken under a dark background may be detected by checking if the average intensity level of the luminance channel in the image is larger than a chosen or set threshold. The contrast value of the image may be computed by the average range of the intensity distribution of the luminance channel near the face area. An image with low contrast background can be found by setting a threshold of the contrast value. If the input image is detected under the situation of dark background or low contrast environment, one process that may be initially applied to the image is disclosed in "Contrast Limited Adaptive Histogram Equalization," Karel Zuiderveld, Graphics Gems IV, pp. 474-485, which is hereby incorporated by reference in its entirety for this purpose. All of the parameter setting may be determined by cross-validation.

Images taken in the outdoor environment sometimes contain directional sun light, which may cause specular and shadow effects on the face areas. All of color channels of skin pixels under specular lighting effects usually become quite bright, and therefore the color-based skin detector may fail to detect those skin pixels. The idea of illumination correction is based on finding some new color space that is insensitive to specular light, as disclosed in "Beyond Lambert: Reconstructing Specular Surfaces Using Color," S. P. Mallick, T. E. Zickler, D. J. Kriegman, P. N. Bellhumeur, Proceedings of the IEEE Conference on Computer Vision and Pattern Recognition, 2005, which is hereby incorporated by reference in its entirety for this purpose.

The following is a system, method or process for enhancing an image based upon correcting outdoor environmental effects, according to one embodiment. Assuming that the sun light can be represented by a white color vector, i.e. [1,1,1] in the RGB color space, a transformation may be found that rotates one color channel to be parallel to the white color vector. The rest of the two rotated color channels will become independent to the white color vector, and therefore the color space formed by these new channels is insensitive to specular illumination from the sun. Denote these two rotated color channels as $I_p$, $I_q$. The new image formed by $I_d = \sqrt{I_p^2 + I_q^2}$ mostly depends on diffuse reflectance. The final output of the illumination correction is the linear blending of the diffused image and each RGB channel of the original image in the following equation: $I_{R,G,B} = \alpha I_d + (1-\alpha) I_{R,G,B}$, where $\alpha$ is the model parameter and may be set to 0.7.

Figure 5:
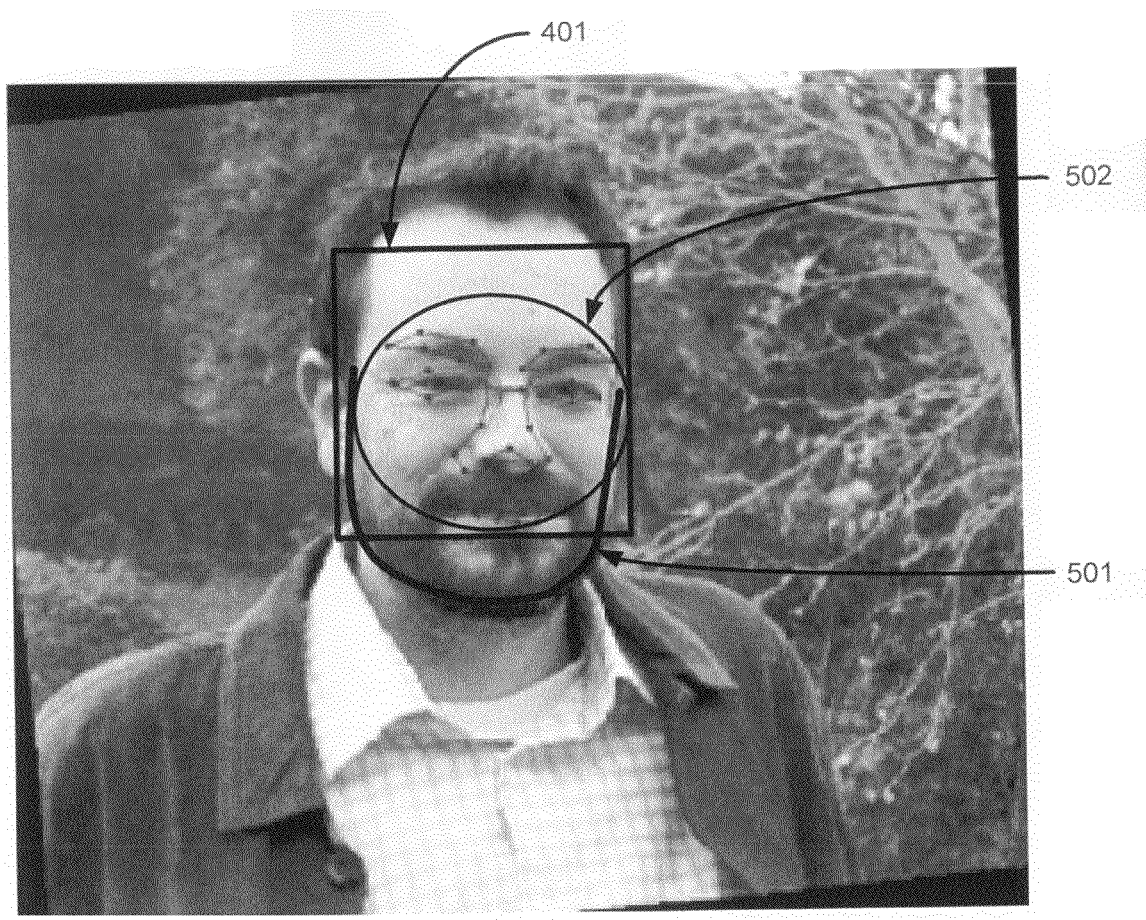
FIG. 5 is the sample image of FIG. 3 slightly zoomed in at the head and providing detection results by the ASM process.

In the embodiment disclosed in FIG. 2, the chin contour is identified at 202. The chin contour usually contains a rigid shape with less variation among different people, and high contrast from the background. The Active Shape Model (hereinafter "ASM") may be utilized to detect the chin contour. The shape of the chin is described by a set of control points. For each input face image, the ASM process tries to match the control points to the chin contour by an iterative approach. First, it searches a better position for each control point around the current position based on the intensity profile. Then the internal model parameters are updated in order to have the best match to these new found positions. The chin contour is a robust feature for initializing the face location and separating the chin and neck areas in the final stage of the segmentation process according to one embodiment. Some implementations of the ASM can find the contours of two eyes, nose, mouth, and chin. FIG. 5 is the sample image of FIG. 3 slightly zoomed in at the head and providing detection results by the ASM process. In FIG. 5, the region 401 represents the detected face area from FIG. 4, 501 references the detected chin contour, the region 502 represents detected contours by the eyes, nose and mouth.

At 203 of FIG. 2, the pose angle is optionally identified. The three dimensional (or "3D") pose can be parameterized by yaw (left-and-right) angle and pitch (up-and-down) angle. The yaw angle is estimated based on a non-linear function $f_{yaw}$ which takes two parameters, the distance between the eye location and the center of the face, $w_{eye}$, and the width of the face, $W_{face}$. The eye location is returned by parts or elements detector described above. A skin color detector is utilized to find the rough location of the face, and then the center of the face and the width of the face are computed. The non-linear function to estimate yaw angle may be based on the following formula:

$$f_{yaw} = \arcsin\left(\frac{w_{eye}}{w_{face}}\right).$$

At 204 of FIG. 2, an initial face mask is generated. The initial face mask may be found based upon shape models and/or color models. For example, a shape model may utilize the ASM control points to suggest the rough face area from the face box detected by the face detector. In the training phase, an average ASM shape model may be trained based on a set of training images. Then all the training images may be aligned by the average ASM model, and finally a generic face mask is generated by averaging all the registered target face masks in the training images. The meaning of each pixel in the generic face mask represents the likelihood probability of that pixel to be inside the face area. In the testing phase, this generic face mask is registered by ASM control points with the face found in the test image, and then the overlapped face area with high likelihood probability will be selected as the initial face mask. In addition, the location of the face box may be utilized for another initial estimation of the face mask from the face detector. The area inside the face box could be applied to crop the face mask generated from the probabilistic template.

An example color model is a 2-D Gaussian parametric model, and trained by skin and non-skin pixels identified manually from a training data set. The description of a parametric color model is disclosed in "Systems and Methods for Rule-based Segmentation for Vertical Person or People With Full or Partial Frontal View in Color Images," U.S. patent application Ser. No. 12/735,093, filed on Jun. 4, 2010, and "System and Method for Segmenting an Image for a Person to Obtain a Mugshot," U.S. patent application Ser. No. 12/603,093, filed on Oct. 21, 2009, each of which are assigned to the assignee of the current application, and each of which are hereby incorporated by reference in their entirety. The color model helps to identify the skin pixels in the test image. Next a set of color pixels are sampled from the refined face mask, and used to re-calculated the 2-D Gaussian parametric model. The refined color model then is computed based on the statistics of the skin color intensity in the test image, and therefore the local variation of the skin color can be well captured by the re-calculated model. Finally, the results from the color model are combined with the initial face mask found by the shape model jointly to form a refined face mask.

In some cases, when the skin or shape model fail to capture the initial face mask the results from one of the unstable models will be discarded, and only the results from the other reliable model will be kept as the final result. The face skin mask may also used to adjust the location of the initial face box returned by the face detector.

Figure 6:
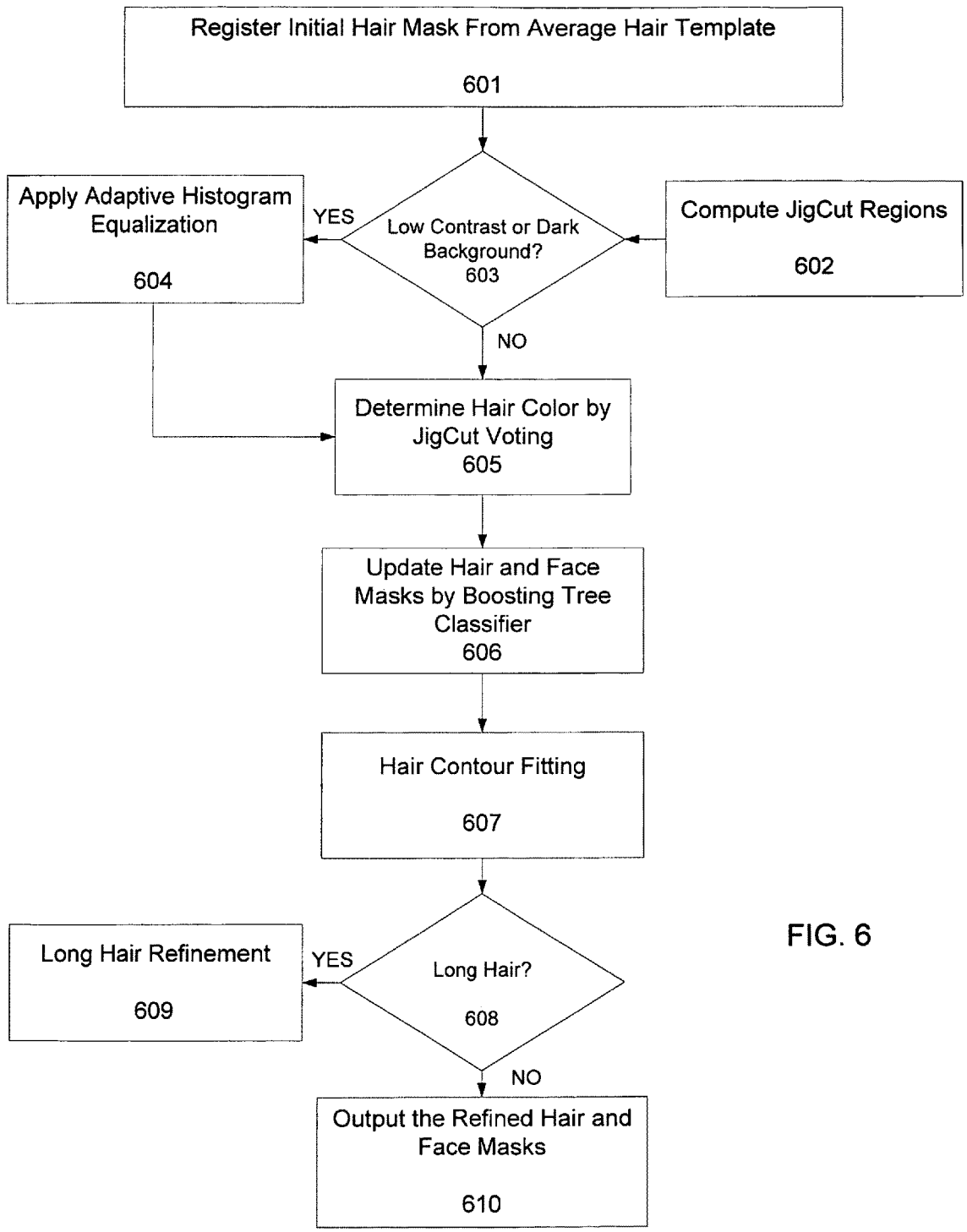
FIG. 6 is a diagrammatic illustration of a system, method or process for generating an initial hair mask according to one embodiment.
Figure 7:
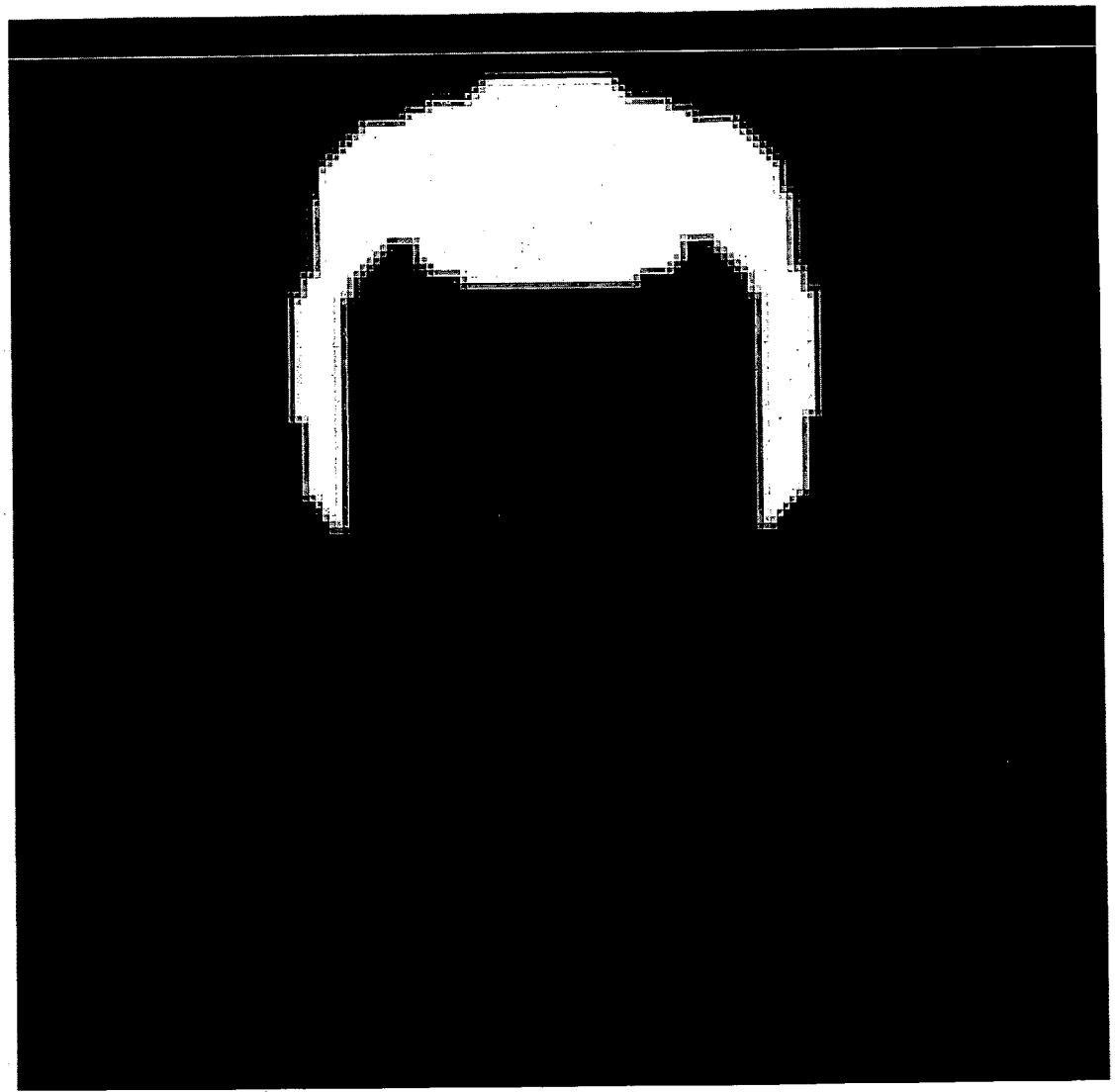
FIG. 7 is a sample average hair mask displayed as a binary image from the frontal pose angle.
Figure 8:
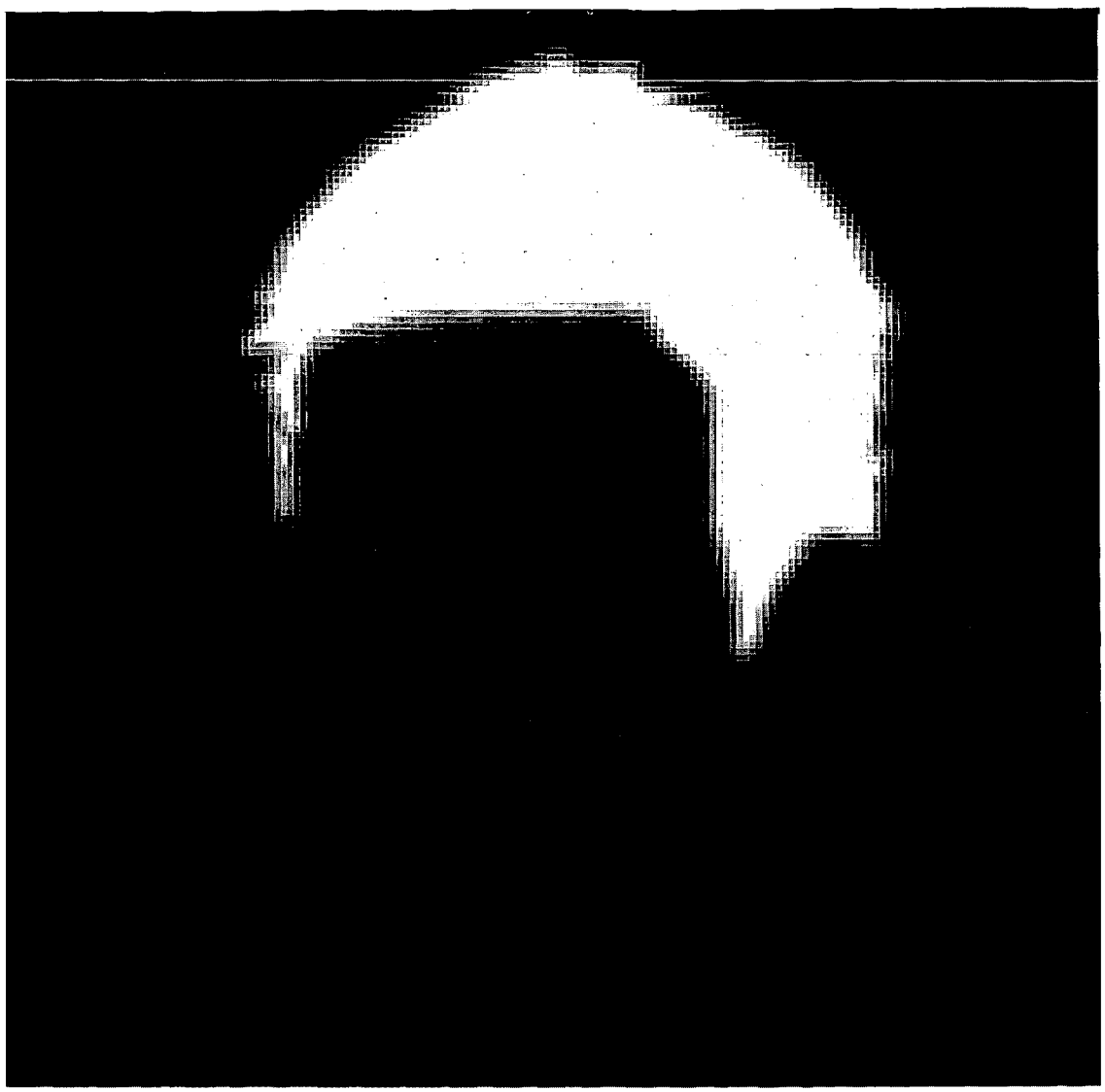
FIG. 8 is a sample average hair mask displayed as a binary image from the pose angle of a left yaw rotation.
Figure 9:
FIG. 9 is a sample average hair mask displayed as a binary image from the pose angle of a right yaw rotation.

At 205 of FIG. 2, an initial hair mask is generated. FIG. 6 is a diagrammatic illustration of a system, method or process for generating an initial hair mask according to one embodiment. At 601 of FIG. 6, an initial hair mask by average hair template is registered. In some embodiments, most reliable region of the hair appearance is the location near the boundary of the top face area, except if the detected person has a bald head. In order to identify the hair near the top of the head, the location, width, and height of the forehead are first estimated based on the skin face map and the position of the eyes returned by the elements or parts detector described above. An average hair mask around top head may be registered based on the center of the forehead, and the scale may be estimated based on the width and height of the forehead. FIG. 7 is a sample average hair mask displayed as a binary image from the frontal pose angle. FIG. 8 is a sample average hair mask displayed as a binary image from the pose angle of a left yaw rotation. FIG. 9 is a sample average hair mask displayed as a binary image from the pose angle of a right yaw rotation.

At 602 of FIG. 6, JigCut regions are computed. In one embodiment, the representation utilized to detect the initial hair region is called JigCut regions. A JigCut region is sometimes called super-pixel, a small region where the color variation is small. The detailed description of JigCut regions is disclosed in "System and Method for Segmentation of an Image into Tned Multi-Scaled Regions," U.S. patent application Ser. No. 12/502,125, filed on Jul. 13, 2009, which is assigned to the assignee of the current application and is hereby incorporated by reference in its entirety. Other processes for creating JigCut regions include those disclosed in "Watersheds in Digital Spaces: An Efficient Algorithm Based on Immersion Simulations," Vincent, Luc, and Pierre Soille, IEEE Transactions of Pattern Analysis and Machine Intelligence, Vol. 13, No. 6, June 1991, pp. 583-598, and "Mean Shift: A Robust Approach Toward Feature Space Analysis," D. Comanicu, P. Meer, IEEE Trans. Pattern Anal. Machine Intell., 24, 603-619, May 2002, which are each incorporated by reference in their entireties for this purpose.

At 603 of FIG. 6, a determination is processed for whether the image comprises low contrast and/or a dark background. An image that comprises low contrast or a dark background may needs further process in order to improve the final segmentation result. An image with low contrast may be detected by checking if the variance of the distribution of the luminance channel is larger than a threshold value. An image with a dark background may be detected by counting the number of dark pixels. If the image contains large a low contrast area or a dark background, the standard process of adaptive histogram equalization at 604 as described above may be applied to enhance the contrast of the image. In an additional embodiment, JigCut regions in dark background or low contrast areas may have a large size and contain both head and background areas. Therefore, large JigCut regions around the face area may be further decomposed into smaller pieces based on the initial hair mask.

At 605 of FIG. 6, hair color is determined by JigCut voting. The process of initial hair detection tries to classify each JigCut region inside the initial hair mask by using a mixture of experts. In one embodiment, three different experts are implemented to detect the three different hair colors black, blonde, and grey based on color information. As should be apparent, any number of experts may be added or removed based upon the colors chosen to be detected.

The following formula may be utilized to define a black hair expert:

$$\text{BlackHair}_{Expert} = \text{BlackHair}_{Expert1} \vee \text{BlackHair}_{Expert2}$$

BlackHair$_{Expert1}$: Thresholding based on Gaussian likelihood of luminance channel in YC$_b$C$_r$ color space.
BlackHair$_{Expert2}$: Thresholding based on the distance to the line between (0,0,0) and (1,1,1) in the normalized RGB color space.

The following formula may be utilized to define a blonde hair expert:

$$\text{Gaussian likelihood of CbC}_r \text{ channels in YC}_b\text{C}_r \text{ color space.}$$

The following formula may be utilized to define a grey hair expert:

$$\text{GreyHair}_{Expert} = \text{GreyHair}_{Expert1} \wedge \text{GreyHair}_{Expert2}$$

GreyHair$_{Expert1}$: If average luminance channel in YC$_b$C$_r$ color space larger than a threshold.
GreyHair$_{Expert2}$: Thresholding based on the distance to the line between (0,0,0) and (1,1,1) in the normalized RGB color space.

After the classification of hair color in each JigCut region, the final hair color may be determined by the voting results of all JigCut regions inside the registered hair mask. A set of pixels in the detected JigCut regions with the major hair color may be selected to retrain the Gaussian mixture model or models. The new Gaussian mixture model may then be used to find more JigCut region of hair pixels, which may be utilized to update the initial hair mask.

Optionally, at 606 of FIG. 6, the hair and/or face masks may be updated by a boosting tree classifier. For example, blonde hair associated with human skin may have similar color distribution in the RGB space, which might make it difficult for the Gaussian model to clearly distinguish pixels between the blonde hair and face skin area. To assist in the distinguishing operation, a two-class classifier implemented based on boosted decision trees utilizing the Adaboost process, as disclosed in "Logistic regression, Adaboost, and Bregman distances," M. Collins, R. Schapire, and Y. Singer, Machine Learning, 48(1-3), 2002, which is hereby incorporated by reference in its entirety. This process allows for taking features of higher order image statistics, such as gradient and texture features, such as the operation disclosed in "Histograms of Oriented Gradients for Human Detection," N Dalal, B. Triggs, Proceedings of the IEEE Conference on Computer Vision and Pattern Recognition, 2008, which is hereby incorporated in its entirety by reference, to better distinguish face and hair regions.

At 607 of FIG. 6, the hair contour fitting process is performed. Due to the variation of hair color, as well as yaw and pitch angles, the hair region may not be found in all instances during the process of the initial hair detection. Hair contour fitting may be able to detect the hair region since the top of the hair contour usually can be well approximated by a parametric curve of round convex shape. In one embodiment, features used to perform hair contour fitting are edges found by a Canny edge detector and the direction of the tangent vector of image gradient. The hair contour may be defined by the following polynomial:

$$y = y_0 + h \cdot \left| \frac{2 \cdot (x - x_0)}{w} \right|^3$$

The fitting operative process tries to perform an exhaustive search in the parametric space $(x_0, y_0, w, h)$ based on the face size and location, as well as yaw angle information. During each search iteration, the distance $d_i$ of each edge pixel $(x_i, y_i)$ in the input image to the nearest point on the curve defined by $(x_0, y_0, w, h)$ is computed, as well as the angular difference $\theta_i$ of the direction of the tangent vectors between those two points. The objective function of the exhaustive search process may be to find the curve associating with the maximum number of the edge points where both Euclidean distance and the angular difference to the nearest points are smaller than some threshold in the following:

$$C_{opt} = \underset{C(x_0, y_0, w, h)}{\operatorname{argmax}} \sum_i \delta(d_i < t_1 \ \& \ \theta_i < t_2),$$

where $t_1$ and $t_2$ are two thresholds, and $\delta(d_i < t_1 \& \theta_i < t_2) = 1$ if $d_i < t_1 \& \theta_i < t_2$ is true.

After the optimal curve $C_{opt}$ is found, pixels inside the curve may be added into the hair mask, and pixels outside the curve will be removed from hair mask to background. The refined results may be further refined by utilizing a random walk operation as disclosed below.

Figure 10:
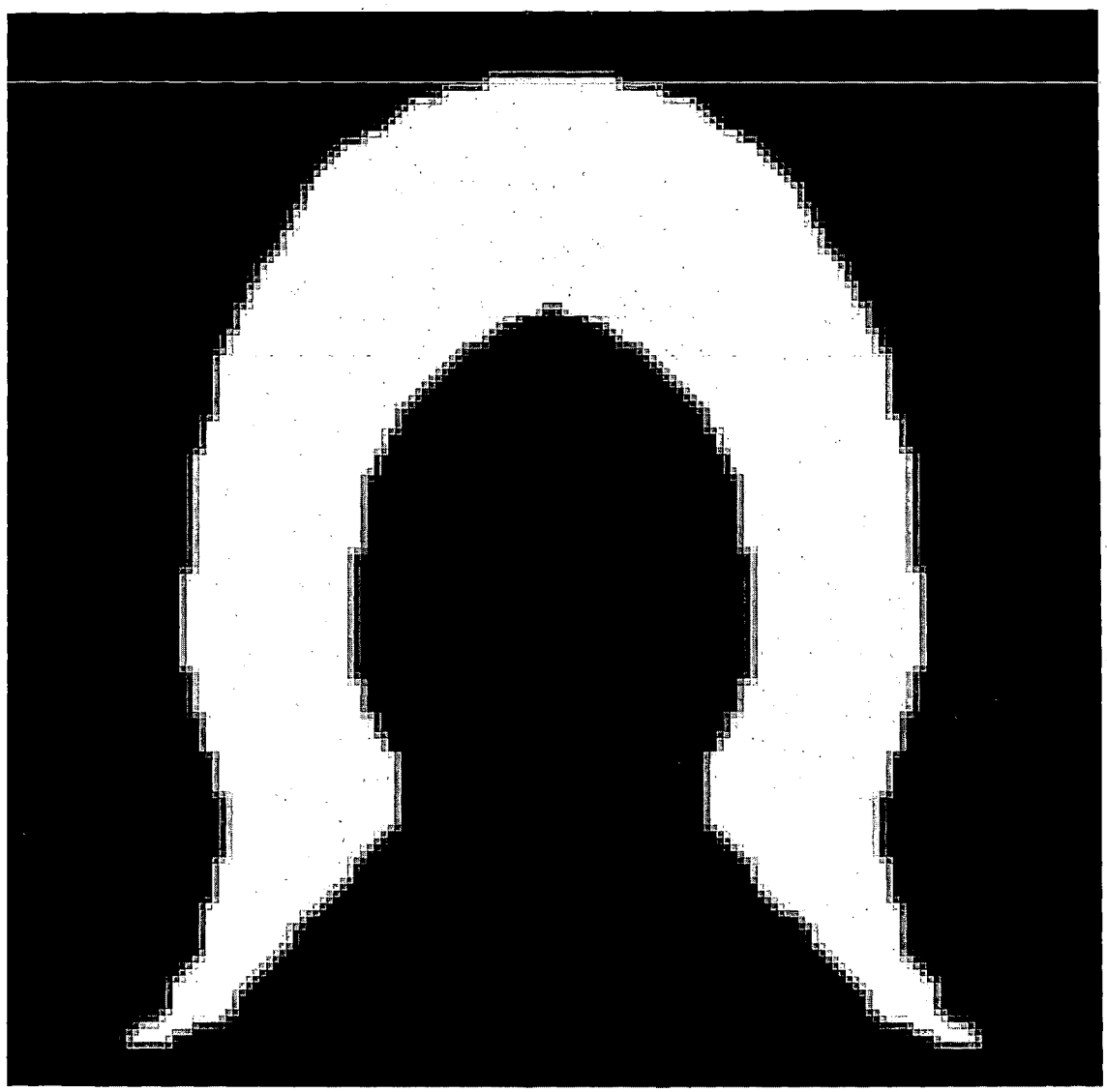
FIG. 10 is a sample average long hair mask displayed as a binary image from the frontal pose angle.
Figure 11:
FIG. 11 is a sample average long hair mask displayed as a binary image from the pose angle of a left yaw rotation.
Figure 12:
FIG. 12 is a sample average long hair mask displayed as a binary image from the pose angle of a right yaw rotation.

At 608 of FIG. 6, determination of whether the head comprises long hair is performed. If the head does comprise long hair, a long hair refinement process may optionally be performed at 609. This operation may lead to a more accurate hair color model, utilizing the hair located on top of the head. A different average hair template may be registered which is based upon a proper long hair template mask, optionally further based on the yaw angle. The operation for registering a hair template is described above. Each pixel inside the mask that currently does not appear in the hair or face mask is selected and then classified again by the refined hair and background Gaussian mixture models in the RGB color space. Optionally, the resulting hair mask may further refined by a random walk operation as disclosed below. FIG. 10 is a sample average long hair mask displayed as a binary image from the frontal pose angle. FIG. 11 is a sample average long hair mask displayed as a binary image from the pose angle of a left yaw rotation. FIG. 12 is a sample average long hair mask displayed as a binary image from the pose angle of a right yaw rotation. Refined hair and face masks are outputted at 610.

Figure 13:
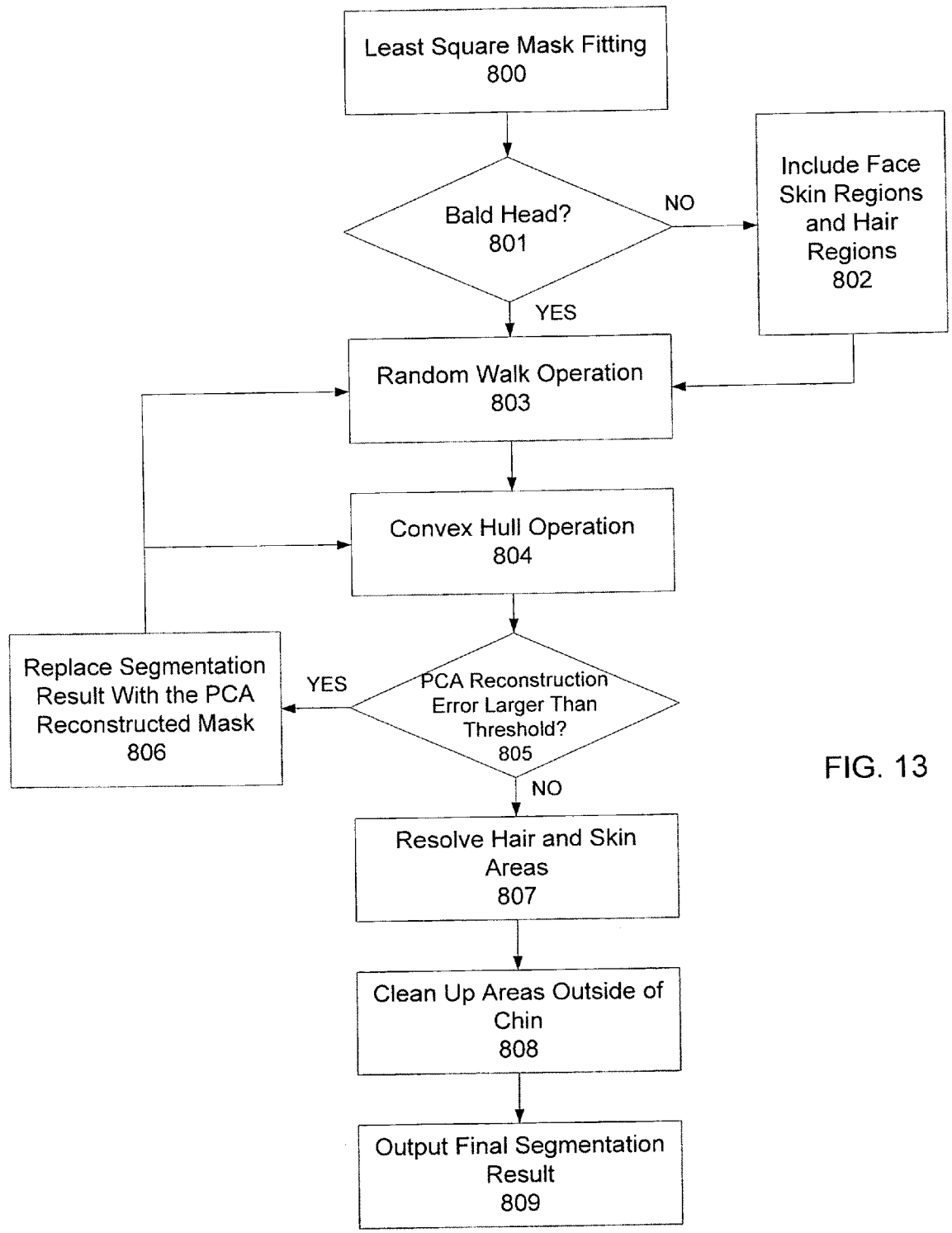
FIG. 13 is a diagrammatic illustration of a system, method, or process for additionally refining the face and hair masks according to one embodiment.

Optionally, at 206 of FIG. 2, additional refinement of the face and hair masks may be performed. FIG. 13 is a diagrammatic illustration of a system, method, or process for additionally refining the face and hair masks according to one embodiment. As should be apparent, all sub-processes within this embodiment are optional and may be chosen based upon the type of refinement elected.

At 800 of FIG. 13, a least square mask fitting operation is performed. The least square mask fitting operation may be elected to refine the head mask that includes both initial results of face and hair regions based on linear combination of channels. The channel set may be computed in following sub-processes. First a set of feature vectors are extracted from each pixel in the input image. Those features may include edge strength map, hue, luminance, and derivative of Gaussian. The standard k-means algorithm may be applied to cluster those feature vectors, with the cluster centroids referred to as textons. The channel set may be constructed based on the fuzzy membership of textons. The optimal head mask and background are assumed to be represented as a linear combination of the channel set. Those weights to linearly combine the channel set can be determined by the Least Square Approach, which is disclosed in "System and Method for Segmenting an Image for a Person to Obtain a Mugshot," U.S. patent application Ser. No. 12/603,093, filed on Oct. 21, 2009, which is assigned to the assignee of the current application, and is hereby incorporated by reference in their entirety.

When there are regions in the background with color similar to skin or hair, such as wooden furniture or sand, it is possible to lose all skin or hair colored pixels after leak square fitting process. The face skin mask from previous modules above may be considered to be a higher confidence mask since it is more robust than the hair mask which is harder to estimate for complex color variation and different hair styles. This sub-process may include the skin mask to the refined mask after least square fitting step. The hair contour may be reevaluated based on the current head mask. Pixels inside the curve could be added into the hair mask, and pixels outside the curve could be removed from hair mask to background. In addition, if the fitting score is less than the fitting score returned at 607 of FIG. 6, all the missing hair pixels could be added back to the current segmentation result.

At 801 of FIG. 13, a determination of whether the head was bold is performed. If the person has a bald head, the initial hair estimation may have included some junk pixels above the head area. A round head classifier may be utilized to detect this case. The premise is that the bald head is close to be round, and the contour of the bald head can be well approximated by a round circle with unknown radius. The detection process picks up all the head contour points after the least square fitting process, and performs a least square fitting to a round circle. The final decision of round head may be determined by thresholding the fitting score. For example, the threshold may be set to 1.1 by cross-validation over a set of training images. Any pixel outside the head contour will not be included in the refined mask if the head is detected to be round. If the final decision is not within the threshold, at 802, face skin regions and hair regions inside the head contour are included.

At 803 of FIG. 13, a random walk operation may be applied to refine the boundary of the current segmentation result. A random walk process is disclosed in "Random Walks For Image Segmentation", Grady L., IEEE Transactions on Pattern Analysis and Machine Intelligence (PAMI), pp. 1768-1783, vol. 28, November 2006, which is hereby incorporated by reference in its entirety. A revised version has been implemented and integrated in the current segmentation framework. This process first tries to construct the Laplacian matrix based on the closed-form affinity, as disclosed in "A Closed-Form Solution to Natural Image Matting," IEEE Transactions on Pattern Analysis and Machine Intelligence (PAMI), Vol. 30, No. 2, February, 2008, which is hereby incorporated by reference in its entirety.

Based on the initial segmentation results, a set of boundary pixels between the background and head mask may be selected. The labels of those boundary pixels are reevaluated by solving a sparse linear system. The revised version includes a regularization term of shape prior, and allows the unknown pixels to be specified and removed from the background.

At 804, a convex hull sub-process is performed. After the global refinement in the previous sub-process, the refined segmentation results may have some dents in the top of the hair area because the Least Square Fitting may not have preserved the boundary of the hair contour. The heuristic that the top of the hair forms a convex contour shape can be used to fill those dents. A convex hull sub-process may be applied to find all of the small dents in the hair boundary. All the pixels inside the region of dents may be selected, and optionally, the random walk operation may again be performed to resolve the labels of those pixels and update the head mask.

At 805, a determination of whether the refined mask's re-construction error of Principle Component Analysis (hereinafter "PCA") projection is within a threshold is performed. The PCA subspace may be trained by a set of face images registered by ASM control points described above. The current refined face mask will be replaced at 806 by the re-constructed mask if the re-construction error is larger than a threshold. If replacement is chosen, the mask may optionally be re-sub-processed by the random walk and/or the convex hull operations, and again reevaluated by the determination at 805.

At 807, hair and skin area resolution operation may optionally occur. The refined head mask after Least Square Fitting and random walk operations may include pixels from the initial background mask. In this sub-process, those pixels will be assigned to either hair or face mask by a Gaussian Mixture Model in the RGB color space and by a random walk operation.

At 808, areas outside the chin may optionally be cleaned up. For example, the neck areas from the current refined face mask may need to be removed. This sub-process may select all the pixels outside the chin contour specified by ASM control points. In one embodiment, the pixels that appear in the hair mask will be kept. The pixels outside the chin contour may be treated as neck, hand, or body areas of the person and removed from the current segmentation result. The random walk sub-process may again be applied to refine the chin boundary of the final segmentation output. At 809, the final segmentation result is outputted, optionally scaled accordingly.

Figure 14:
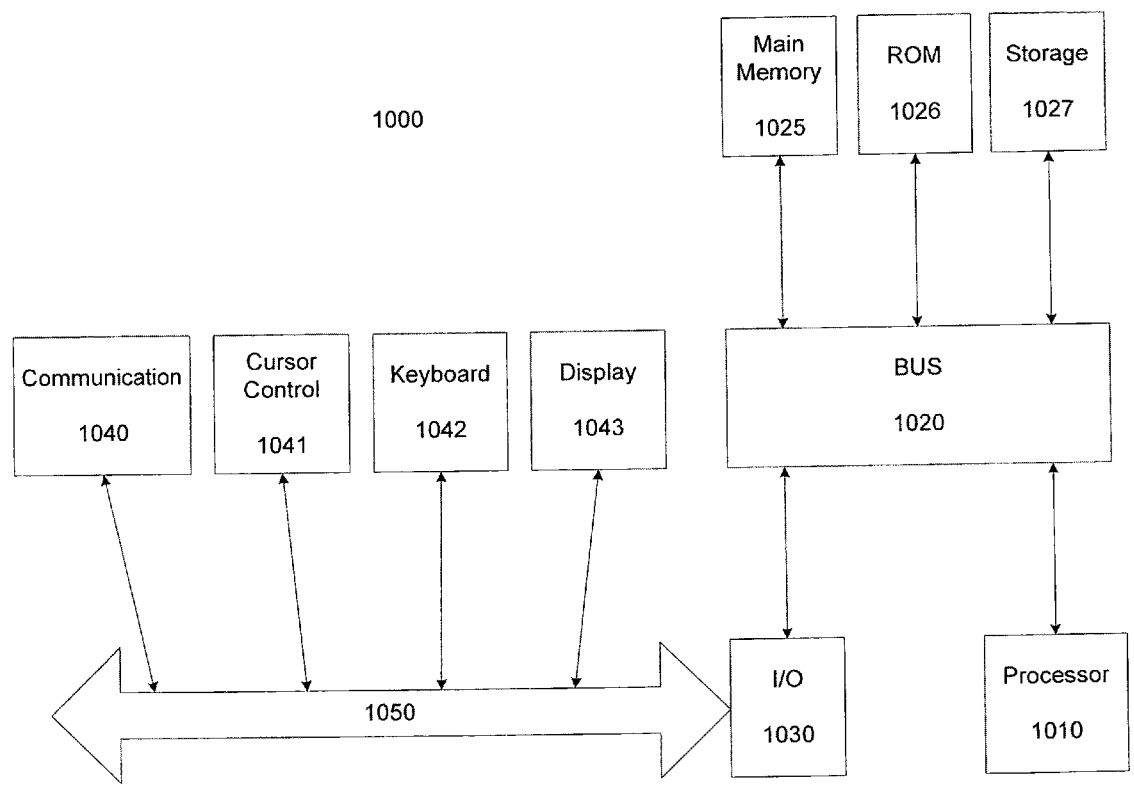
FIG. 14 is an illustration of an exemplary embodiment of an architecture 1000 of a computer system suitable for executing the methods disclosed herein.

As desired, the methods disclosed herein may be executable on a conventional general-purpose computer (or microprocessor) system. Additionally, or alternatively, the methods disclosed herein may be stored on a conventional storage medium for subsequent execution via the general-purpose computer. FIG. 14 is an illustration of an exemplary embodiment of an architecture 1000 of a computer system suitable for executing the methods disclosed herein. Computer architecture 1000 is used to implement the computer systems or image processing systems described in various embodiments of the method for segmentation. As shown in FIG. 14, the architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 is used to store temporary variables or other intermediate information during execution of instructions by processor 1010. Architecture 1000 includes a read only memory (ROM) and/or other static storage device 1026 coupled to bus 1020 for storing static information and instructions used by processor 1010. Although the architecture 1000 is shown and described as having selected system elements for purposes of illustration only, it will be appreciated that the method for refinement of segmentation using spray paint markup can be executed by any conventional type of computer architecture without limitation.

A data storage device 1027 such as a magnetic disk or optical disk and its corresponding drive is coupled to computer system 1000 for storing information and instructions. The data storage device 1027, for example, can comprise the storage medium for storing the method for segmentation for subsequent execution by the processor 1010. Although the data storage device 1027 is described as being magnetic disk or optical disk for purposes of illustration only, the methods disclosed herein can be stored on any conventional type of storage media without limitation.

Architecture 1000 is coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

Foregoing described embodiments are provided as illustrations and descriptions. They are not intended to limit the embodiments to precise form described. In particular, it is contemplated that functional implementation of the embodiments described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this detailed description, but rather by the claims following.

What is claimed is:

1. A method of identifying a facial and hair portions of a desired image comprising:
receiving the desired image;
receiving a first plurality of control data points associated with a facial feature of a person from a memory component, wherein the first plurality of control data points is based on a first plurality of training data point sets, wherein each training data point set of the first plurality of training data point sets is associated with a facial feature of a training image of a first plurality of training images;

applying the first plurality of control data points to the desired image, wherein the facial portion of the desired image is substantially a match between the first plurality of control data points and the desired image;

receiving a second plurality of control data points associated with a hair feature of a person from the memory component, wherein the second plurality of control data points is based on a second plurality of training data point sets, wherein each training data point set of the second plurality of training data point sets is associated with a hair feature of a training image of a second plurality of training images, and wherein the second plurality of control data points is based on averages of training data point sets of the second plurality of training data points;

applying the second plurality of control data points to the desired image to determine whether the desired image includes a hair portion; and identifying the hair portion associated with the desired image in response to determining that the desired image includes the hair portion, wherein the identifying is based on a location, width, or forehead associated with the hair portion of the desired image.

2. The method as described by claim 1, wherein the first plurality of control data points is an average between training data point sets of the first plurality of training data point sets.

3. The method as described by claim 1 further comprising:
enhancing image quality of the facial portion of the desired image.

4. The method as described by claim 1 further comprising:
iteratively applying the first plurality of control data points to the desired image based on intensity profile of the desired image to identify the facial portion of the desired image.

5. The method as described by claim 1 further comprising:
identifying a pose angle associated with the facial portion of the desired image based on eye location, center of a face, width of the face, and a pitch angle associated with the pose angle.

6. The method as described by claim 1, wherein the first plurality of control data points is associated with a color of the facial portion of the desired image.

7. A method of identifying a chin and hair portions of a desired image comprising:
receiving the desired image;
receiving a first plurality of control data points from a memory component, wherein the first plurality of control data points is associated with a chin feature of a person that is substantially invariant from one person to another person, and wherein the first plurality of control data points is based on a first plurality of training data point sets, and wherein each training data point set of the first plurality of training data point sets is associated with a chin feature of the training image of a first plurality of training images;
applying the first plurality of control data points to the desired image, wherein the chin portion of the desired image is substantially a match between the first plurality of control data points and the desired image;
receiving a second plurality of control data points associated with a hair feature of a person from the memory component, wherein the second plurality of control data points is based on a second plurality of training data point sets, wherein each training data point set of the second plurality of training data point sets is associated with a hair feature of a training image of a second plurality of training images, and wherein the second plurality of control data points is based on averages of training data point sets of the second plurality of training data points;

applying the second plurality of control data points to the desired image to determine whether the desired image includes a hair portion; and identifying the hair portion associated with the desired image in response to determining that the desired image includes the hair portion, wherein the identifying is based on a location, width, or forehead associated with the hair portion of the desired image.

8. The method as described by claim 7 further comprising:
enhancing image quality of the chin portion of the desired image.

9. The method as described by claim 7 further comprising:
iteratively applying the first plurality of control data points to the desired image based on intensity profile of the desired image to identify the chin portion of the desired image.

10. The method as described by claim 7 further comprising:
identifying a pose angle associated with the chin portion of the desired image based on eye location, center of a face, width of the face, and a pitch angle associated with the pose angle.

11. The method as described by claim 7, wherein the first plurality of control data points of the chin portion of the person has a higher contrast profile with portions outside of the object chin portion in comparison to areas within the chin portion of the person.

12. A non-transitory computer readable storage medium having computer-readable program code stored thereon for causing a processor to implement a method of identifying a facial and hair portions of a desired image comprising:
receiving the desired image;
receiving a first plurality of control data points associated with a facial feature of a person from a memory component, wherein the first plurality of control data points is based on a first plurality of training data point sets, wherein each training data point set of the first plurality of training data point sets is associated with a facial feature of a training image of a first plurality of training images;
applying the first plurality of control data points to the desired image, wherein the facial portion of the desired image is substantially a match between the first plurality of control data points and the desired image;
receiving a second plurality of control points associated with a hair feature of a person from the memory component, wherein the second plurality of control data points is based on a second plurality of training data point sets, wherein each training data point set of the second plurality of training data point sets is associated with a hair feature of a training image of a second plurality of training images, and wherein the second plurality of control data points is based on averages of training data points of the second plurality of training data points;
applying the second plurality of control data points to the desired image to determine whether the desired image includes a hair portion; and
identifying the hair portion associated with the desired image in response to determining that the desired image includes the hair portion, wherein the identifying is based on a location, width, or forehead associated with the hair portion of the desired image.

13. The non-transitory computer readable storage medium as described by claim 12, wherein the first plurality of control data points is an average between training data point sets of the first plurality of training data point sets.

14. The non-transitory computer readable storage medium as described by claim 12 further comprising:
   iteratively applying the first plurality of control data points to the desired image based on intensity profile of the desired image to identify the facial portion of the desired image.

15. The non-transitory computer readable storage medium as described by claim 12 further comprising:
   identifying a pose angle associated with the facial portion of the desired image based on eye location, center of a face, width of the face, and a pitch angle associated with the pose angle.

* * * * *